United States Patent
Gattner

(10) Patent No.: US 10,649,617 B2
(45) Date of Patent: May 12, 2020

(54) METHOD AND A SYSTEM FOR GENERATING A MULTIDIMENSIONAL GRAPHICAL USER INTERFACE

(71) Applicant: Hololab Sp. z o.o., Swiebodzin (PL)

(72) Inventor: Dariusz Gattner, Zielona Gora (PL)

(73) Assignee: Hololab Sp. z o.o., Swiebodzin (PL)

( * ) Notice: Subject to any disclaimer, the term of this patent is extended or adjusted under 35 U.S.C. 154(b) by 0 days.

(21) Appl. No.: 16/513,735

(22) Filed: Jul. 17, 2019

(65) Prior Publication Data

US 2020/0026410 A1 Jan. 23, 2020

(30) Foreign Application Priority Data

Jul. 18, 2018 (EP) ..................................... 18461578

(51) Int. Cl.
  *G06F 3/0481* (2013.01)
  *G06F 9/451* (2018.01)
  *G06F 3/0484* (2013.01)

(52) U.S. Cl.
  CPC ........ *G06F 3/04815* (2013.01); *G06F 3/0484* (2013.01); *G06F 9/451* (2018.02)

(58) Field of Classification Search
  CPC ................................................. G06F 3/04815
  USPC ....................................................... 715/848
  See application file for complete search history.

(56) References Cited

U.S. PATENT DOCUMENTS

| | | | | |
|---|---|---|---|---|
| 5,731,814 A | * | 3/1998 | Bala .................... | G06F 3/04842 715/810 |
| 6,281,898 B1 | * | 8/2001 | Nikolovska ........... | G06F 3/0481 715/848 |
| 6,590,593 B1 | * | 7/2003 | Robertson ............. | G06F 3/0481 715/782 |
| 7,013,435 B2 | * | 3/2006 | Gallo .................. | G06F 3/04815 715/850 |
| 7,119,819 B1 | * | 10/2006 | Robertson ........... | G06F 3/04815 715/782 |
| 7,639,256 B1 | * | 12/2009 | Yablonski ............. | G06T 11/206 345/440 |
| 8,907,943 B2 | * | 12/2014 | Piemonte .............. | G06F 3/0346 345/419 |
| 2004/0135820 A1 | * | 7/2004 | Deaton ............... | G06F 3/04815 715/848 |
| 2005/0010876 A1 | * | 1/2005 | Robertson ............. | G06F 3/0481 715/782 |

(Continued)

*Primary Examiner* — Daniel Rodriguez
(74) *Attorney, Agent, or Firm* — Mark M. Friedman

(57) ABSTRACT

A method for generating a multidimensional graphical user interface for navigating through a set of elements, in a device having a controller operable by an input interface and generating the multidimensional graphical user interface via a display interface. The method includes generating a three-dimensional structure having a top base, a bottom base and a side surface, wherein on the bottom base there are located objects to be analyzed, and on the top base there are located current status information related to the objects and a global element. The method also includes dividing the side surface into sectors presenting the elements related to the objects, wherein the elements are automatically scaled correspondingly to the global element, wherein the global element is adjustable by a user, wherein a number of the sectors is dynamically adapted to the number of the objects currently present on the bottom base.

10 Claims, 11 Drawing Sheets

(56) References Cited

U.S. PATENT DOCUMENTS

| | | | | |
|---|---|---|---|---|
| 2006/0212833 A1* | 9/2006 | Gallagher | G06T 11/206 | 715/848 |
| 2006/0224998 A1* | 10/2006 | Riss | G06F 3/04815 | 715/848 |
| 2006/0288284 A1* | 12/2006 | Peters | G06F 40/18 | 715/700 |
| 2007/0011617 A1* | 1/2007 | Akagawa | G06F 3/04815 | 715/738 |
| 2008/0134086 A1* | 6/2008 | Liao | G06F 3/0482 | 715/810 |
| 2008/0270946 A1* | 10/2008 | Risch | G06F 16/34 | 715/848 |
| 2009/0187862 A1 | 7/2009 | Dacosta | | |
| 2010/0315417 A1* | 12/2010 | Cho | G06F 1/169 | 345/419 |
| 2011/0063287 A1* | 3/2011 | McNeill | G06F 3/011 | 345/419 |
| 2012/0290987 A1* | 11/2012 | Gupta | G06F 30/13 | 715/848 |
| 2013/0097563 A1* | 4/2013 | Pacheco Rodrigues Velho | G06F 3/04815 | 715/850 |
| 2013/0141428 A1* | 6/2013 | Gipson | G06F 3/04815 | 345/419 |
| 2015/0169190 A1* | 6/2015 | Girardeau | G06F 3/04842 | 715/771 |
| 2018/0095634 A1* | 4/2018 | Alexander | G06F 3/011 | |
| 2018/0300024 A1* | 10/2018 | Andersen | G09B 7/00 | |
| 2019/0005717 A1* | 1/2019 | Singh | G06F 3/011 | |
| 2019/0138183 A1* | 5/2019 | Rosas | G06F 3/017 | |
| 2019/0236849 A1* | 8/2019 | Seshita | A63F 13/52 | |
| 2019/0310761 A1* | 10/2019 | Agarawala | G06F 3/0485 | |
| 2019/0313059 A1* | 10/2019 | Agarawala | G06T 19/20 | |
| 2019/0340821 A1* | 11/2019 | Chen | G06F 3/011 | |
| 2020/0073534 A1* | 3/2020 | Alexander | G06F 3/0346 | |

* cited by examiner

METHOD AND A SYSTEM FOR GENERATING A MULTIDIMENSIONAL GRAPHICAL USER INTERFACE

TECHNICAL FIELD

The present disclosure relates to a method and a system for generating a multidimensional graphical user interface, in particular a virtual multidimensional graphical user interface.

BACKGROUND

Currently, most of multimedia devices equipped with a display screen are operated by means of a graphical user interface (GUI). It allows a user to navigate through available device options, to change its settings etc. However, due to technological progress, the user devices tend to be more and more sophisticated and offer a greater amount of features and functions, so their operation becomes more complicated and inconvenient.

There are known graphical user interfaces for presenting and arranging available device options in a three-dimensional manner, however often they are not adaptable to individual user needs.

The currently available methods of presenting data in the graphical user interfaces are limited to predefined schemes and do not allow convenient manipulation of relations between the presented data.

SUMMARY OF THE INVENTION

There is a need to provide a method and a system for generating a virtual graphical user interface, which would allow to organizing and presenting data in a manner customizable by an end user, as well as utilizing the interface as a convenient data analyzing or process controlling tool.

In one aspect of the present invention, there is provided a method for generating a multidimensional graphical user interface for navigating through a set of elements, in a device comprising a controller operable by an input interface and configured to generate the multidimensional graphical user interface via a display interface, the method comprising the steps of: generating a three-dimensional structure having a top base, a bottom base and a side surface, wherein on the bottom base there are located objects to be analyzed, and on the top base there are located current status information related to the objects and a global element; dividing the side surface into sectors presenting the elements related to the objects, wherein the elements are automatically scaled correspondingly to the global element, wherein the global element is adjustable by a user, wherein a number of the sectors is dynamically adapted to the number of the objects currently present on the bottom base; receiving from the controller instructions to modify the number of objects present on the bottom base and adjusting the number of objects present on the bottom base accordingly; and receiving from the controller instructions to transfer the objects from the bottom base to the sectors and to transfer the elements from the sectors to the bottom base and transferring the objects and the elements on the graphical user interface accordingly.

The method may further comprise generating additional three-dimensional structures comprising sectors for presenting details related to the sectors of the first generated three-dimensional structure.

The method may further comprise generating a further three-dimensional structure comprising sectors for presenting details related to the sectors of the structures.

The method may further comprise creating multiple sectors for a particular element.

The method may further comprise receiving from the controller instructions to drill down through the sectors and performing the drill down operation accordingly.

The method may further comprise receiving from the controller instructions to define at least one global element by selecting one of the presented elements.

In another aspect, the invention is related to a non-transitory computer-readable medium comprising machine-executable code that, upon execution by a device comprising a controller operable by an input interface and configured to generate a multidimensional graphical user interface via a display interface, implements a method for generating the multidimensional graphical user interface for navigating through a set of elements, the method comprising the steps of: generating a three-dimensional structure having a top base, a bottom base and a side surface, wherein on the bottom base there are located objects to be analyzed, and on the top base there are located current status information related to the objects and a global element; dividing the side surface into sectors presenting the elements related to the objects, wherein the elements are automatically scaled correspondingly to the global element, wherein the global element is adjustable by a user, wherein the number of the sectors is dynamically adapted to the number of the objects currently present on the bottom base; receiving from the controller instructions to modify the number of objects present on the bottom base and adjusting the number of objects present on the bottom base accordingly; and receiving from the controller instructions to transfer the objects from the bottom base to the sectors and to transfer the elements from the sectors to the bottom base and transferring the objects and the elements on the graphical user interface accordingly.

In another aspect, the invention is related to a device comprising a controller operable by an input interface and configured to generate a multidimensional graphical user interface via a display interface, wherein the controller is configured to implement a method for generating the multidimensional graphical user interface for navigating through a set of elements, the method comprising the steps of: generating a three-dimensional structure having a top base, a bottom base and a side surface, wherein on the bottom base there are located objects to be analyzed, and on the top base there are located current status information related to the objects and a global element; dividing the side surface into sectors presenting the elements related to the objects, wherein the elements are automatically scaled correspondingly to the global element, wherein the global element is adjustable by a user, wherein the number of the sectors is dynamically adapted to the number of the objects currently present on the bottom base; receiving from the controller instructions to modify the number of objects present on the bottom base and adjusting the number of objects present on the bottom base accordingly; and receiving from the controller instructions to transfer the objects from the bottom base to the sectors and to transfer the elements from the sectors to the bottom base and transferring the objects and the elements on the graphical user interface accordingly.

In another aspect, the invention is related to a set of devices as described herein and coupled with each other via a network.

The set of devices may be configured to form a common shared virtual space.

BRIEF DESCRIPTION OF DRAWINGS

The object of the present disclosure is presented by means of example embodiments on a drawing, wherein.

NOTATION AND NOMENCLATURE

Some portions of the detailed description which follows are presented in terms of data processing procedures, steps or other symbolic representations of operations on data bits that can be performed on computer memory. Therefore, a computer executes such logical steps thus requiring physical manipulations of physical quantities.

Usually these quantities take the form of electrical or magnetic signals capable of being stored, transferred, combined, compared, and otherwise manipulated in a computer system. For reasons of common usage, these signals are referred to as bits, packets, messages, values, elements, symbols, characters, terms, numbers, or the like.

Additionally, all of these and similar terms are to be associated with the appropriate physical quantities and are merely convenient labels applied to these quantities. Terms such as "processing" or "creating" or "transferring" or "executing" or "determining" or "detecting" or "obtaining" or "selecting" or "calculating" or "generating" or the like, refer to the action and processes of a computer system that manipulates and transforms data represented as physical (electronic) quantities within the computer's registers and memories into other data similarly represented as physical quantities within the memories or registers or other such information storage.

A computer-readable (storage) medium, such as referred to herein, typically may be non-transitory and/or comprise a non-transitory device. In this context, a non-transitory storage medium may include a device that may be tangible, meaning that the device has a concrete physical form, although the device may change its physical state. Thus, for example, non-transitory refers to a device remaining tangible despite a change in state.

DETAILED DESCRIPTION OF THE INVENTION

Figure 1:
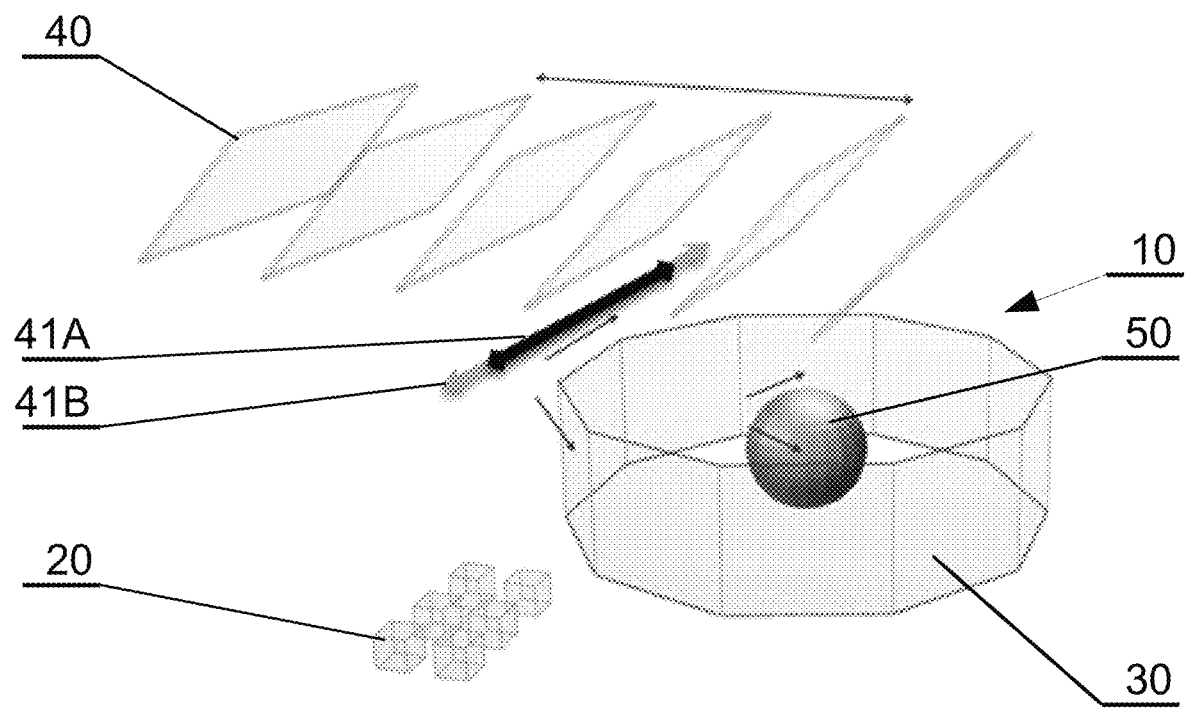
FIG. 1 presents schematically a structure of a virtual multidimensional graphical user interface.

FIG. 1 presents schematically an example of a structure of a virtual multidimensional graphical user interface (GUI).

Figure 8:
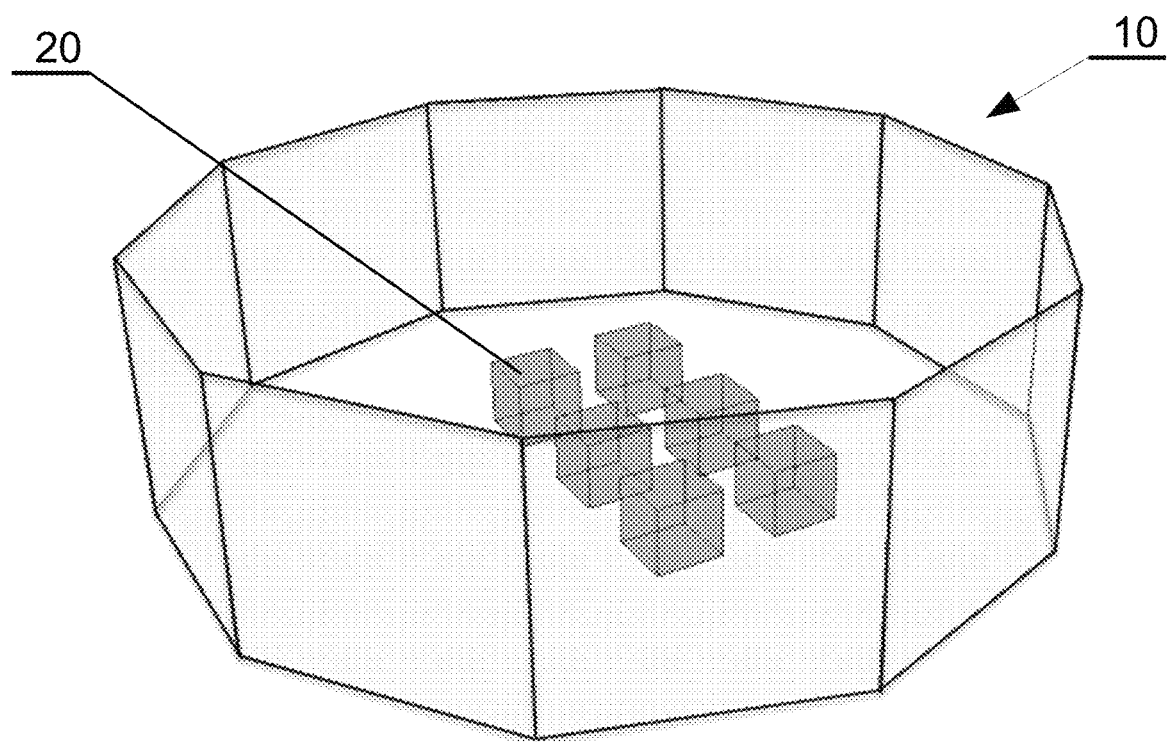
FIG. 8 presents the cylinder with the objects on a bottom base.

The presented structure of the GUI will be discussed in a context of presenting production data. Generally speaking, the multidimensional GUI has a form of a three-dimensional structure, for example it may have a form of a cylinder 10. Alternatively, it may have a form of multiple three-dimensional structures (e.g. all being cylinders or geometrical objects of different shape). A side surface of the geometrical object may be divided into multiple sectors 30. The sectors 30 visualize elements (dimensions) which relate to objects 20. The objects 20 can be arranged by a user on a bottom base of a cylinder. The user may adjust the number of the objects present on the bottom base, for example the user may drag the object from an inventory outside the cylinder and drop it on the bottom base (as presented in FIG. 8). Upon placing the object 20 on the base, the corresponding data, arranged in a form of the elements, is presented in sectors on the side surface of the cylinder 10. Each sector 30 of the side surface relates to a specific group of elements related to the object 20.

The user 50 (represented symbolically as a sphere) in the virtual reality of the GUI is located inside the cylinder 10. In order to navigate (to browse) through the sectors 30 or the objects 20, the user may rotate (by rotating user's head when wearing a virtual device) or may rotate the cylinder, for example by moving user's hand. Selecting or executing particular options or elements of the GUI may be performed by gestures according to the known techniques.

A top base of the cylinder may present events or alerts 40 corresponding to the objects 20 or corresponding to a GUI system application. The top base also presents a global element (dimension) 41, for example time interval 41, which may be adjusted by the user to filter the elements which are present on the side surfaces and the bottom/top base of the three-dimensional structure. As a result of adjustment of the global element 41, the remaining elements are automatically scaled correspondingly, i.e. only elements which are comprised within the range of the global element 41 (filter) are displayed. The global element 41 may be defined by the user and may be selected from any of the available elements. The data of the top base is updated constantly.

Furthermore, the elements (present on the side surfaces or/and on the top/bottom base of the cylinder) may be scaled/updated/filtered depending on two or more global elements 41A, 41B which may be defined by the user. For example the first global element 41A may define a time interval and the second global element 41B may define a type of objects/elements to be displayed. As a result only the objects/elements which are comprised within the type defined by the global element 41B are displayed on the side surfaces and only the events/alerts which relate to these objects/elements are display on the top base wherein the events/alerts and objects/elements are further limited to the time interval specified by the global element 41A.

For example, the object may represent a production machine and a first sector may present an element related to availability of the machine, a second sector to a currently scheduled operations (orders), a third sector to a currently installed tools, and further sectors to components needed for performing the scheduled operations, or maintenance actions etc. The alerts may relate to current breakdowns or stoppages of the machine.

The virtual multidimensional graphical user interface (GUI) may be also utilized in an augmented reality, wherein the cylinder 10 is virtual and the objects 20 located on the bottom base are real objects, like for example machines located on a floor of a factory. The user 50 can leave the cylinder which is related to a particular machine and enter the other cylinder which is related to another machine.

Figure 2:
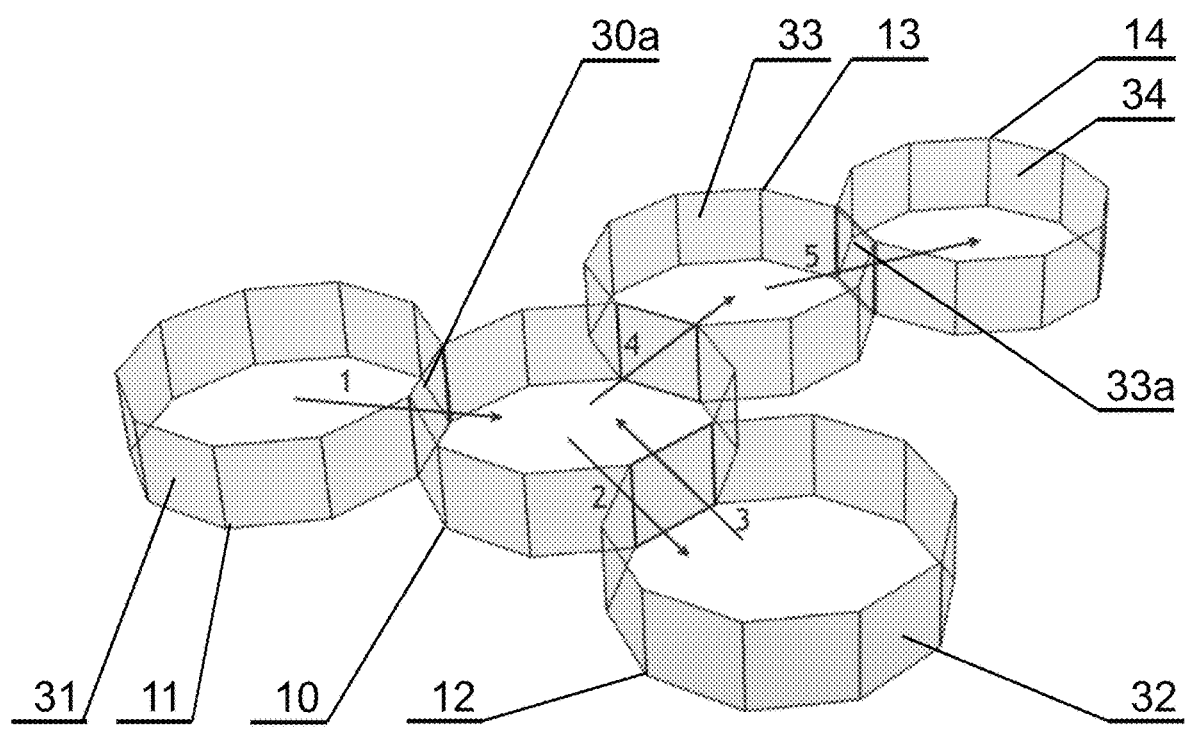
FIG. 2 presents an example of a history of navigation through the GUI.

FIG. 2 presents an example of a history of navigation through the GUI. The user may drill down through the sectors 30, which results in moving into another cylinder 11-13 comprising respectively sectors 31-33 related to greater details of the sectors 30 from the cylinder 10. For example, when selecting the sector 30a, the user drills down to the cylinder 11 comprising sectors 31 related to the details of the sector 30a. Moreover, the user may further drill down through the sectors 31-33 of the cylinders 11-13 in order to browse through even greater details of the sectors 31-33, for example the cylinder 14 comprises sectors 34 related to details of the sector 33a selected from the cylinder 13. The GUI system stores the history of navigation, allowing the user to jump into an arbitrary step of the path of navigation. Moreover, the GUI system provides a map of cylinders presenting possible navigating paths (directions) between cylinders and their sectors. The user may directly jump to a desired location by choosing it on the map.

Figure 3:
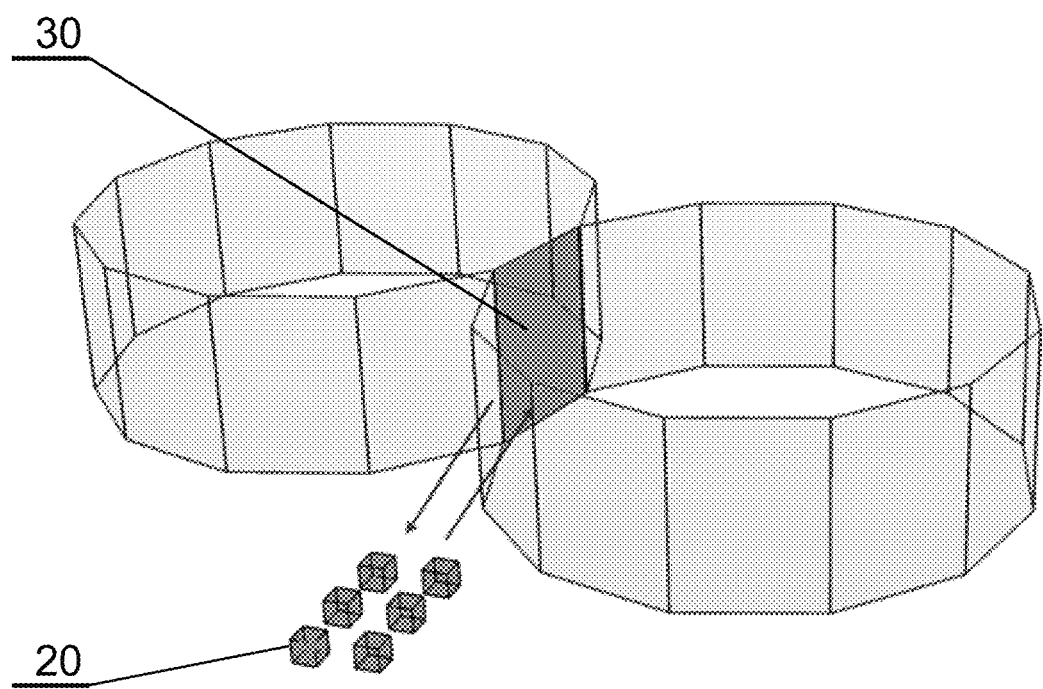
FIG. 3 presents a possibility of transferring an object to a sector.

FIG. 3 presents a possibility of transferring the object to the sector and vice versa. The user may alter the structure of data presented by the multidimensional GUI by transferring the object from the objects inventory or from the bottom base of the cylinder to the sector, and also to transfer the sector or an item from the sector to the bottom base of the cylinder.

Figure 4:
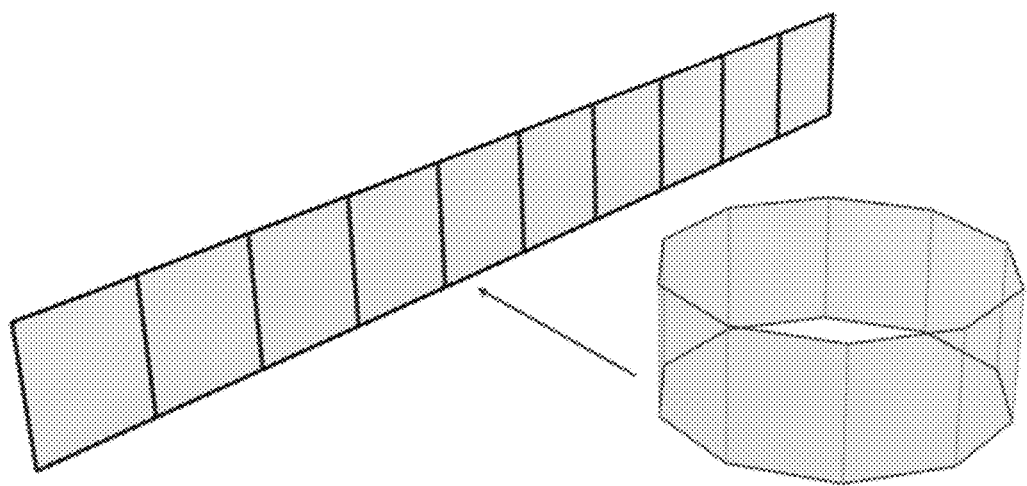
FIG. 4 presents a two-dimensional representation of a side surface.

FIG. 4 presents a two-dimensional representation of the side surface. The sectors 30-34 of the side surface of the cylinder 10-14 may be presented in two-dimensional form. For example as presented, the sectors may be arranged in a row, or alternatively the sectors may be arranged in a list. As mentioned before, the user 50 may move from one machine to the other, and after leaving the two-dimensional representation of the side surface of the cylinder corresponding to the particular machine and moving to the other machine with its corresponding cylinder represented in three-dimensional form, the user 50 may return to the previous machine with the corresponding two-dimensional representation of the side surface. In other words the user may freely move between machines, wherein each machine has a corresponding cylinder which may be represented in two-dimensional or three-dimensional form according to the user needs.

Figure 5:
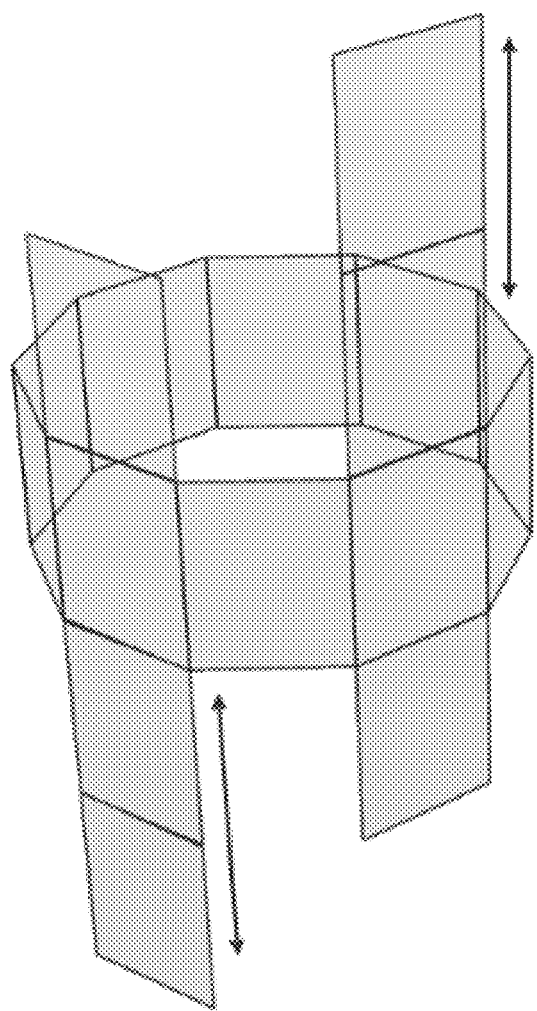
FIG. 5 presents multiplied sectors.

FIG. 5 presents multiplied sectors. The sectors 30 for a particular element may be multiplied, for example, in case when there is more than one object present on the bottom base of the cylinder. For example when the user places two objects representing production machines, some of the sectors present elements which are common for the two machines like scheduled operations, while the sectors presenting elements relating to machine tools or materials needed to perform these operations may be different for each machine which results in the extension of sectors within particular element.

Figure 6:
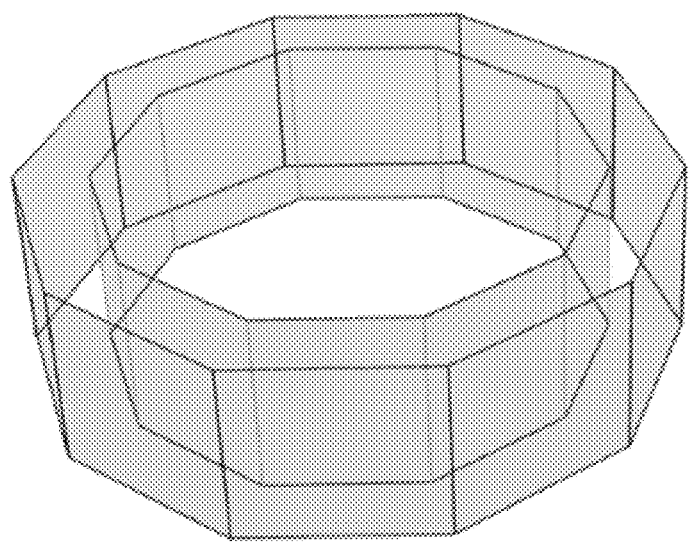
FIG. 6 presents a result of decreasing the number of analyzed objects.

FIG. 6 presents a result of decreasing the number of analyzed objects. The decrease of the number of analyzed objects (for example when the object is removed from the bottom base of the cylinder) may result in a decrease of the number of sectors present on the side surface of the cylinder.

Figure 7:
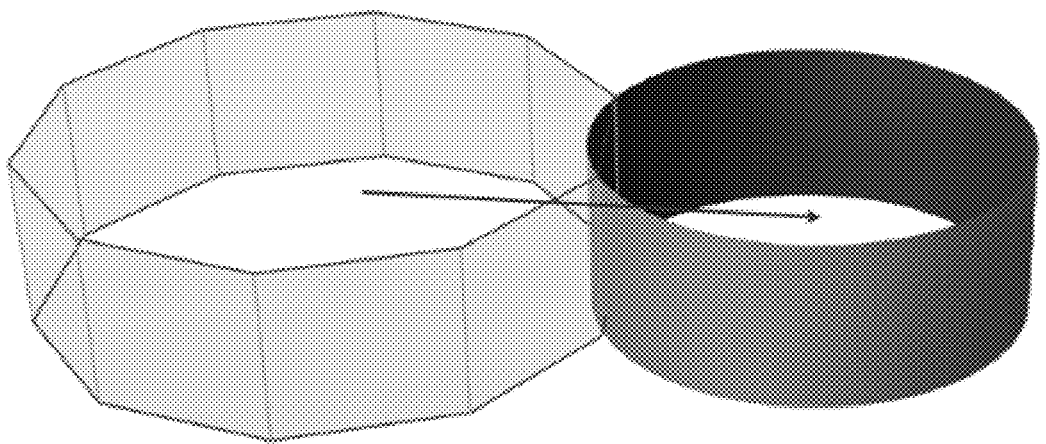
FIG. 7 presents an expansion of the sector into the side surface of a cylinder.

FIG. 7 presents an expansion of the sector into the side surface of a cylinder. The single sector may be expanded to be represented as a uniform side surface of the cylinder. The data contained in such sector is arranged on a part or on the whole side surface of the cylinder.

Figure 9:
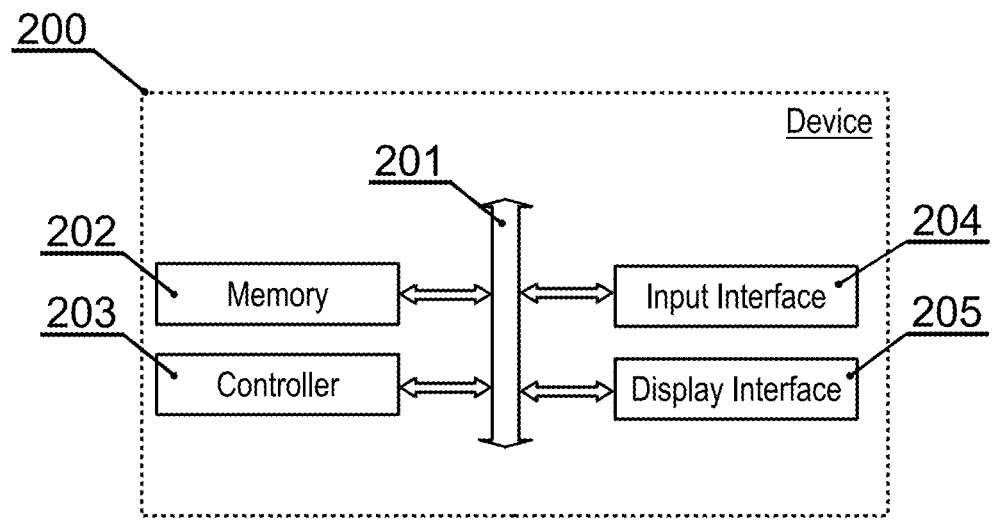
FIG. 9 presents a structure of a device for generating the multidimensional virtual GUI.

FIG. 9 presents a structure of a device for generating the multidimensional virtual GUI. The device 200 comprises a memory 202 (ROM and RAM) unit used for storing data as well as software executed by a controller 203. The device 200 further comprises a display interface 205 configured to display the graphical user interface (GUI) to the user, an input interface 204, such as a touch input interface, a voice input interface, a gesture input interface, and/or a virtual reality headset with head motion tracking sensors. A bidirectional data bus 201 may be employed to enable communication between the modules and the controller 203 of the device.

Figure 10:
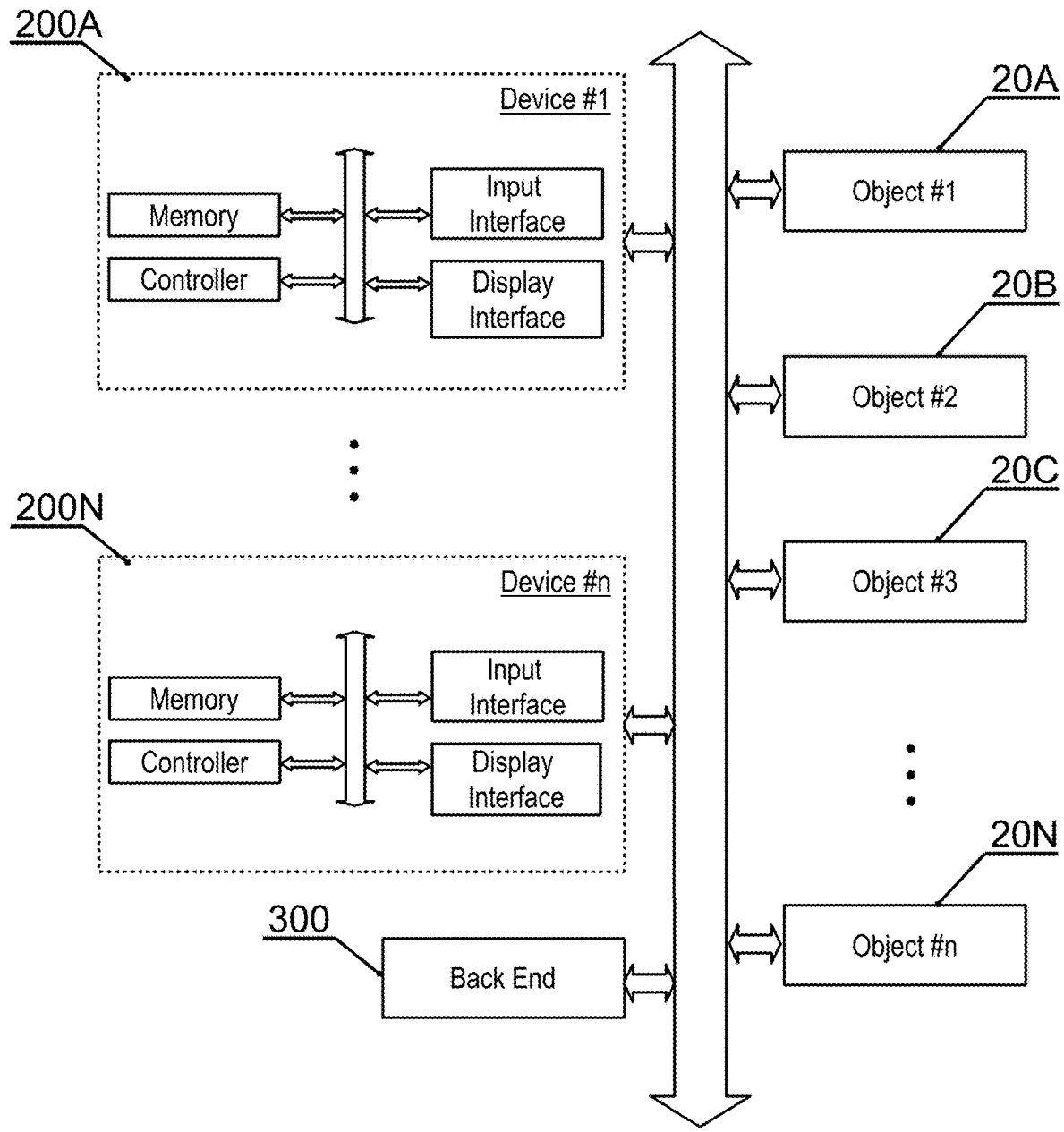
FIG. 10 presents an exemplary network environment for operating the device.

FIG. 10 presents an exemplary network environment for operating the device. The device 200 may be connected to a network comprising multiple objects 20A-20N (for example production machines) and multiple devices 200A-200N which may exchange data between each other and the objects and between a Back-end 300 constituting for example an arbitrary ERP (Enterprise Resource Planning) system. The objects 20A-20N and the Back-end 300 may be controlled by the devices 200A-200N, as well as the devices 200A-200N may be controlled by means of each other. In particular the devices 200A-200N may form common, shared virtual spaces (cyberspaces).

Figure 11:
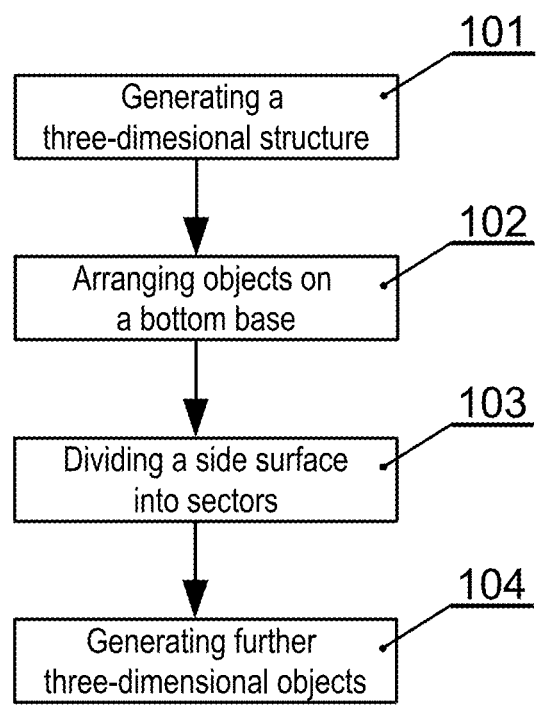
FIG. 11 presents steps of the method for generating multidimensional GUI.

FIG. 11 presents steps of the method for generating multidimensional GUI. First, in step 101, a three-dimensional structure in a form of a cylinder is generated. Next, in step 102, the objects to be analyzed are placed on the bottom base of the cylinder. Next, in step 103 the side surface is divided into sectors presenting the elements related to the objects, wherein an amount of the sectors is relative and dynamically adapted to an amount of the elements. Next in step 104 further three-dimensional structures 11-13 are generated comprising sectors 31-33 for presenting details related to the sectors 30 of the first structure 10.

Apart from utilizing the multidimensional virtual GUI for analyzing production data, it may be used for analyzing any other data, for example statistical data, stock exchange data, geodetic data, weather data, as well as for analyzing cartographic and geodetic maps. Apart from analyzing data, the multidimensional virtual GUI may be also utilized as a tool for manipulating data, for example for decision-making or changing parameters of a system analyzed by means of the GUI. In other words it may be used for presenting any type of elements or items arranged in sets and subsets or folders and subfolders etc. In an augmented reality the user may operate on real objects.

The presented multidimensional virtual graphical user interface is adaptable to an amount of the analyzed objects and allows an arbitrary number of elements related to the objects to be presented by means of an arbitrary number of sectors, which are preferably distributed on a side surface of a cylinder.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system".

Furthermore, the present invention may take the form of a computer program product embodied in any tangible medium of expression having computer usable program code embodied in the medium.

It can be easily recognized, by one skilled in the art, that the aforementioned method may be performed and/or controlled by one or more computer programs.

Such computer programs are typically executed by utilizing the computing resources in a computing device.

Applications are stored on a non-transitory medium. An example of a non-transitory medium is a non-volatile memory, for example a flash memory while an example of a volatile memory is RAM. The computer instructions are executed by a processor. These memories are exemplary recording media for storing computer programs comprising computer-executable instructions performing all the steps of the computer-implemented method according the technical concept presented herein.

While the invention presented herein has been depicted, described, and has been defined with reference to particular preferred embodiments, such references and examples of implementation in the foregoing specification do not imply any limitation on the invention. It will, however, be evident that various modifications and changes may be made thereto without departing from the broader scope of the technical concept. The presented preferred embodiments are exemplary only, and are not exhaustive of the scope of the technical concept presented herein.

Accordingly, the scope of protection is not limited to the preferred embodiments described in the specification, but is only limited by the claims that follow.

What is claimed is:

1. A method for generating a multidimensional graphical user interface for navigating through a set of elements, in a device comprising a controller operable by an input interface and configured to generate the multidimensional graphical user interface via a display interface, the method comprising the steps of:
    generating a three-dimensional structure having a top base, a bottom base and a side surface, wherein on the bottom base there are located objects to be analyzed, and on the top base there are located current status information related to the objects and a global element;
    dividing the side surface into sectors presenting the elements related to the objects, wherein the elements are automatically scaled correspondingly to the global element, wherein the global element is adjustable by a user, wherein a number of the sectors is dynamically adapted to the number of the objects currently present on the bottom base;
    receiving from the controller instructions to modify the number of objects present on the bottom base and adjusting the number of objects present on the bottom base accordingly; and
    receiving from the controller instructions to transfer the objects from the bottom base to the sectors and to transfer the elements from the sectors to the bottom base and transferring the objects and the elements on the graphical user interface accordingly.

2. The method according to claim 1 further comprising generating additional three-dimensional structures comprising sectors for presenting details related to the sectors of the first generated three-dimensional structure.

3. The method according to claim 2, further comprising generating a further three-dimensional structure comprising sectors for presenting details related to the sectors of the structures.

4. The method according to claim 1, further comprising creating multiple sectors for a particular element.

5. The method according to claim 1, further comprising receiving from the controller instructions to drill down through the sectors and performing the drill down operation accordingly.

6. The method according to claim 1, further comprising receiving from the controller instructions to define at least one global element by selecting one of the presented elements.

7. A non-transitory computer-readable medium comprising machine-executable code that, upon execution by a device comprising a controller operable by an input interface and configured to generate a multidimensional graphical user interface via a display interface, implements a method for generating the multidimensional graphical user interface for navigating through a set of elements, the method comprising the steps of:
    generating a three-dimensional structure having a top base, a bottom base and a side surface, wherein on the bottom base there are located objects to be analyzed, and on the top base there are located current status information related to the objects and a global element;
    dividing the side surface into sectors presenting the elements related to the objects, wherein the elements are automatically scaled correspondingly to the global element, wherein the global element is adjustable by a user, wherein the number of the sectors is dynamically adapted to the number of the objects currently present on the bottom base;
    receiving from the controller instructions to modify the number of objects present on the bottom base and adjusting the number of objects present on the bottom base accordingly; and
    receiving from the controller instructions to transfer the objects from the bottom base to the sectors and to transfer the elements from the sectors to the bottom base and transferring the objects and the elements on the graphical user interface accordingly.

8. A device comprising a controller operable by an input interface and configured to generate a multidimensional graphical user interface via a display interface, wherein the controller is configured to implement a method for generating the multidimensional graphical user interface for navigating through a set of elements, the method comprising the steps of:
    generating a three-dimensional structure having a top base, a bottom base and a side surface, wherein on the bottom base there are located objects to be analyzed, and on the top base there are located current status information related to the objects and a global element;
    dividing the side surface into sectors presenting the elements related to the objects, wherein the elements are automatically scaled correspondingly to the global element, wherein the global element is adjustable by a user, wherein the number of the sectors is dynamically adapted to the number of the objects currently present on the bottom base;
    receiving from the controller instructions to modify the number of objects present on the bottom base and adjusting the number of objects present on the bottom base accordingly; and
    receiving from the controller instructions to transfer the objects from the bottom base to the sectors and to transfer the elements from the sectors to the bottom base and transferring the objects and the elements on the graphical user interface accordingly.

9. A set of devices according to claim 8 coupled with each other via a network.

10. The set of devices according to claim 9, configured to form a common shared virtual space.

* * * * *